US011540511B2

(12) United States Patent
Vasquez et al.

(10) Patent No.: US 11,540,511 B2
(45) Date of Patent: Jan. 3, 2023

(54) PROTECTOR ASSEMBLY FOR HANDLING AND TRANSPORTING CORNEAL TISSUE

(71) Applicant: SAN DIEGO EYE BANK, San Diego, CA (US)

(72) Inventors: Nathan A. Vasquez, Chula Vista, CA (US); Katieri M. DeLessio, San Diego, CA (US)

(73) Assignee: San Diego Eye Bank, San Diego, CA (US)

( * ) Notice: Subject to any disclaimer, the term of this patent is extended or adjusted under 35 U.S.C. 154(b) by 273 days.

(21) Appl. No.: 17/103,496

(22) Filed: Nov. 24, 2020

(65) Prior Publication Data

US 2022/0159947 A1 May 26, 2022

(51) Int. Cl.
*B01L 3/00* (2006.01)
*A01N 1/02* (2006.01)
*B01L 3/02* (2006.01)

(52) U.S. Cl.
CPC ......... *A01N 1/0273* (2013.01); *A01N 1/0205* (2013.01); *B01L 3/0213* (2013.01); *B01L 3/0217* (2013.01); *B01L 2300/042* (2013.01); *B01L 2300/0832* (2013.01); *B01L 2300/12* (2013.01)

(58) Field of Classification Search
CPC .. A01N 1/0273; A01N 1/0205; A01N 1/0263; B01L 3/0213; B01L 3/0217; B01L 2300/042; B01L 2300/0832; B01L 2300/12; B01L 3/50825; B01L 2200/0647; B01L 2200/12; B01L 3/0282; B01L 2200/0684
See application file for complete search history.

(56) References Cited

U.S. PATENT DOCUMENTS

2020/0206029 A1* 7/2020 Abdullayev ............ A61F 2/142

* cited by examiner

*Primary Examiner* — Jennifer Wecker
*Assistant Examiner* — Oyeleye Alexander Alabi
(74) *Attorney, Agent, or Firm* — Neil K. Nydegger

(57) ABSTRACT

A protector assembly for handling, storing and transporting donor tissue in a transfer pipette includes a distal cap and a proximal plug that are respectively engageable with opposite ends of the pipette. Structurally, the pipette includes a distally tapered fluid chamber which is in fluid communication with an extension tube. The distal cap is dimensioned for friction engagement with the fluid chamber of the pipette and it is formed with a plurality of vents to establish fluid communication through the vents with the fluid chamber. On the other hand, the proximal plug is dimensioned for a friction engagement with the extension tube to prevent leakage of solution from the fluid chamber of the pipette when the proximal plug is engaged with the pipette. In combination, an engagement of the protector assembly with a pipette holding a donor tissue will protect and preserve the donor tissue during handling and transport.

20 Claims, 2 Drawing Sheets

PROTECTOR ASSEMBLY FOR HANDLING AND TRANSPORTING CORNEAL TISSUE

FIELD OF THE INVENTION

The present invention pertains generally to protective devices for the handling and transport of donor tissue samples. More particularly, the present invention pertains to protective assemblies that can be selectively engaged with a tissue transfer pipette for protecting the pipette and a donor tissue sample being held in the pipette. The present invention is particularly, but not exclusively, useful as a protector assembly that physically protects a tissue transfer pipette, and a donor tissue sample held inside the pipette, while providing fluid access for a tissue preserving solution to the donor tissue, during handling and transport.

BACKGROUND OF THE INVENTION

The handling, storage and transport of donor tissue requires great care and precise manipulation, while maintaining the donor tissue in a unique environment that is suitable for its preservation. Of concern here is corneal tissue that has been harvested and should be transplanted within the next 12-14 days, Clearly, corneal tissue is delicate and fragile, and if not handled properly it can be easily damaged. Moreover, corneal tissue is sensitive to temperature and exposure to air.

Heretofore, corneal tissue has typically been harvested and held in the fluid chamber of a tissue transfer pipette. Such pipettes are well known and are widely used in the pertinent art. These pipettes, however, are typically made of clear glass and, consequently, without some additional protection they can still be easily broken or damaged.

In light of the above, it is an object of the present invention to provide a protector assembly that can be directly engaged with a tissue transfer pipette, to thereby provide enhanced protection for both the donor tissue and the pipette in which it is held. Yet another object of the present invention is to provide a protector assembly that is easily engaged with, and easily disengaged from, a tissue transfer pipette. Still another object of the present invention is to provide a protector assembly that maintains a liquid environment that is needed for tissue preservation during storage and transport. Another object of the present invention is to provide a protector assembly for a tissue transfer pipette that is easy to use, is simple to manufacture, and is competitively cost effective.

SUMMARY OF THE INVENTION

A protector assembly for handling and transporting a donor tissue in a tissue transfer pipette includes a proximal plug and a distal cap which respectively engage with opposite ends of the pipette to essentially surround the pipette. As envisioned for the present invention, the tissue transfer pipette will be made of a clear glass, and both the proximal plug and the distal cap of the protector assembly will be made of silicone. When engaged with the pipette the protector assembly provides two important safeguards for the donor tissue. For one, the protector assembly protects against damage or breakage of the pipette while a donor tissue is being held therein. For another, when the pipette and donor tissue are submerged into a liquid solution in a transport container, the protector assembly establishes fluid contact for the donor tissue with the solution in the container.

As envisioned for the present invention, a tissue transfer pipette is provided which is formed with a fluid chamber for holding a liquid solution and a donor tissue. Structurally, the fluid chamber of the pipette is tapered in a distal direction to a relatively small open distal end, which is preferably beveled to facilitate the collection and discharge of a donor tissue into and out of the fluid chamber. Further, the fluid chamber has an outer diameter $D_c$ along the taper at a predetermined distance from the distal end of the pipette.

The pipette also includes an extension tube which is connected in fluid communication with the fluid chamber of the pipette. Structurally, the extension tube extends axially in a proximal direction from the fluid chamber. The extension tube is also formed with an external rib that extends radially outwardly from the extension tube to an outer diameter $D_r$.

As mentioned above, the protector assembly of the present invention includes a distal cap which is adapted to be engaged with the tapered fluid chamber of the pipette. In detail, the distal cap is tubular shaped, it is elongated, and it has a hollow interior that extends between an open end and a closed end. Importantly, the distal cap is formed with a plurality of vents that permit fluid communication into the interior of the distal cap. Thus, the distal cap also allows fluid communication from outside the distal cap with the tapered end of the pipette inside the distal cap. Dimensionally, the hollow interior of the distal cap is sized with an inner diameter $D_i$ to establish a friction engagement with the outer diameter $D_c$ on the taper of the fluid chamber. For the purposes of engaging and disengaging the distal cap with/from the pipette, the open proximal end of the distal cap will preferably be beveled.

The other component of the protector assembly is a cylindrical shaped, elongated proximal plug, which is adapted for engagement with the extension tube of the pipette. Structurally, the proximal plug has a hollow interior between an open end and a closed end which defines an inner diameter $D_i$. Specifically, $D_i$ in the hollow interior of the proximal plug is dimensioned for a friction engagement with the diameter $D_r$ of the rib on the extension tube. The importance of this friction fit is to prevent the leakage of solution from the fluid chamber of the pipette when the proximal plug is engaged with the pipette. For the purposes of engaging and disengaging the proximal plug with/from the pipette, the open distal end of the proximal plug will preferably be beveled.

For storage and transportation purposes, a protector assembly will be engaged with a tissue transfer pipette holding a donor tissue, and the combination will be placed in a container that is filled with a solution. At its intended destination, the protector assembly, which is engaged with the transfer pipette holding a donor tissue, can be retrieved from the container. The protector assembly can then be removed from the pipette and the donor tissue can be retrieved from the pipette for operational use. Preferably, the solution used during handling and transport of a donor tissue is either Optical GS or Life4C.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
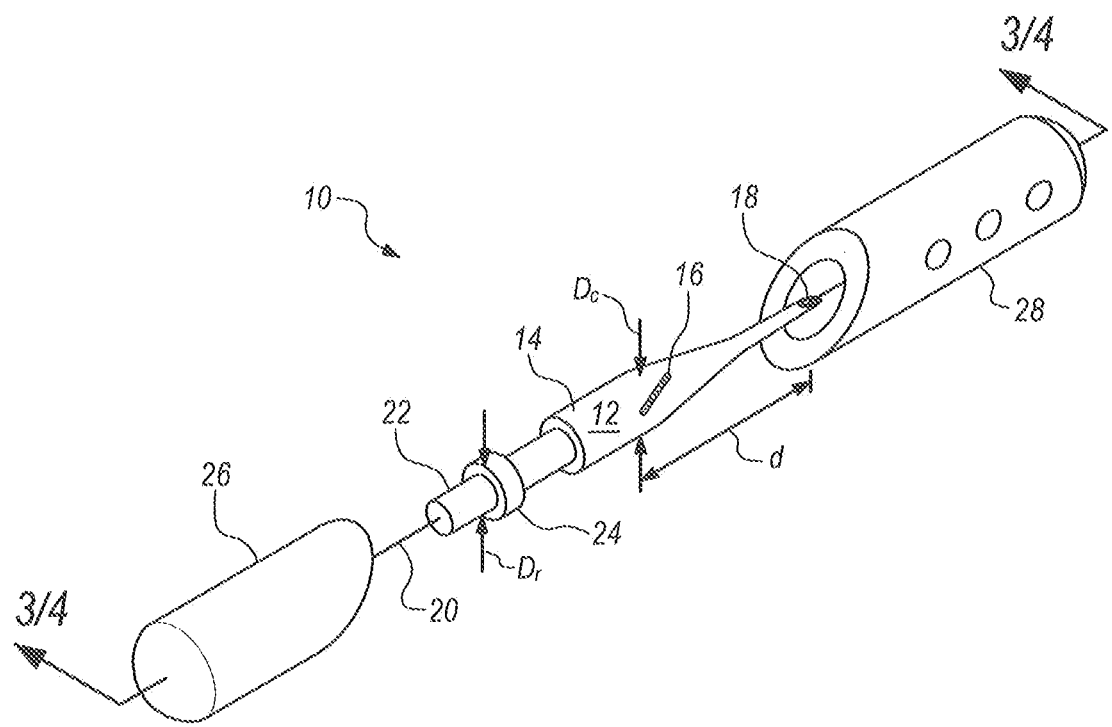
FIG. 1 is an exploded perspective view of the protector assembly positioned for engagement with a pipette holding a donor tissue sample in accordance with the present invention.

Referring initially to FIG. 1 a system for holding, storing and transporting a donor tissue in accordance with the present invention is shown and is generally designated 10. As shown, the system 10 includes a pipette 12 that includes a fluid chamber 14 for holding a donor tissue 16 therein. It is also shown that the fluid chamber 14 is tapered in a distal direction and has an outer diameter $D_c$ at a predetermined distance d from a distal end 18 of the fluid chamber 14. Preferably, the distal end 18 of the fluid chamber 14 is beveled, as shown, to facilitate the drawing in and the expelling of donor tissue 16 into and from the fluid chamber 14. FIG. 1 also shows that the fluid chamber 14 generally defines an axis 20.

In FIG. 1 it will also be seen that the pipette 12 includes an extension tube 22 which extends axially is a proximal direction from the fluid chamber 14. Further, the extension tube 22 is formed with a rib 24 that extends radially from the extension tube 22 with a diameter $D_r$. Still referring to FIG. 1, it is seen that the system 10 includes a protector assembly which includes a proximal plug 26 and a distal cap 28.

Figure 2:
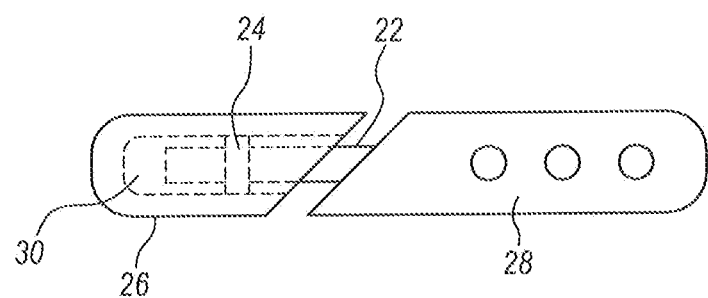
FIG. 2 is a plan view of the protector assembly with a distal protective cap and a proximal plug (portions shown in phantom) engaged with the tissue transfer pipette of the present invention to protect donor tissue during handling and transport.

With reference to FIG. 2 it will be appreciated that the proximal plug 26 of the protector assembly is adapted for engagement with the extension tube 22 of the pipette 12. Similarly, the distal cap 28 of the protector assembly is adapted for engagement with the fluid chamber 14 of the pipette 12. In this combination, the tissue transfer pipette 12 is protected during handling, storage and transport. Consequently, the donor tissue 16 that is being held in the fluid chamber 14 of the pipette 12 is also protected.

Figure 3:
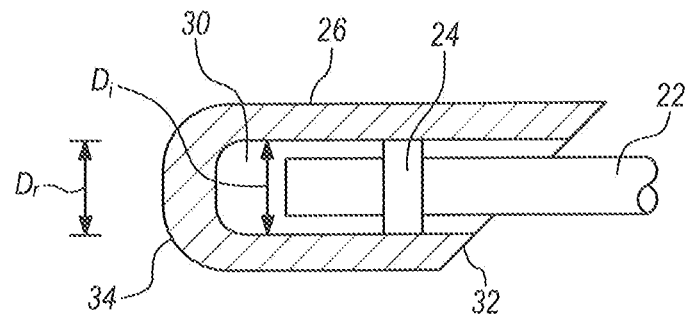
FIG. 3 is a cross section view of the proximal plug as would be seen along the line 3-3 in FIG. 1 when engaged with the extension tube of the present invention.

With reference to FIG. 3, it will be seen that the proximal plug 26 is formed with a hollow interior 30 that extends between an open distal end 32 and a closed proximal end 34. It is also seen that the hollow interior 30 is dimensioned with an inner diameter $D_i$ to receive the extension tube 22 of the pipette 12 therein for a liquid-sealing, friction engagement with the rib 24. Importantly, when there is an engagement of the proximal plug 26 with the rib 24 of the extension tube 22, the proximal plug 26 will effectively prevent the leakage or spillage of solution in the fluid chamber 14 of the pipette 12 from the fluid chamber 14.

Figure 4:
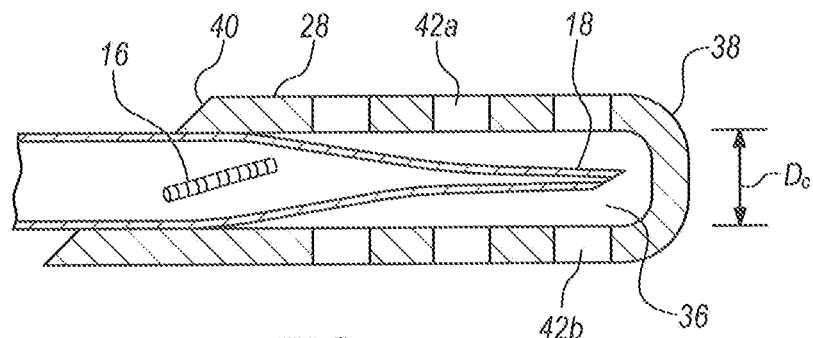
FIG. 4 is a cross section view of the distal protective cap as would be seen along the line 4-4 in FIG. 1 when engaged with the tissue transfer pipette of the present invention.

As shown in FIG. 4, the hollow interior 36 of the distal cap 28 extends from a closed distal end 38 to an open proximal end 40. Further, it is shown in FIG. 4 that the hollow interior 36 of the distal cap 28 is equal to the same diameter $D_c$ that is identified at a location along the taper of the fluid chamber 14. Further, FIG. 4 also shows that the distal cap 28 is formed with a plurality of axially aligned vents 42, of which the vents 42a and 42b are only exemplary. Thus, when the distal cap 28 is engaged with the fluid chamber 14 of the pipette 12, the distal end 18 of the pipette 12 will be positioned in the hollow interior 36 of the distal cap 28.

Figure 5:
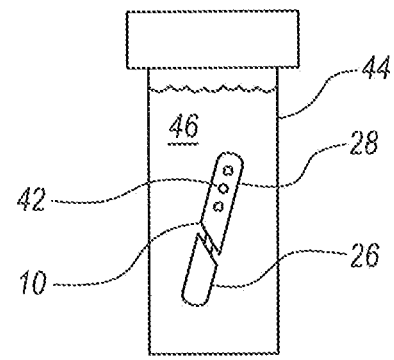
FIG. 5 is an elevation view of a container showing a protector assembly engaged with a tissue transfer pipette and submerged in a solution inside the container for handling and/or transport.

The importance of the vents 42 of the distal cap 28 is best appreciated with reference to FIG. 5 where a system 10 is shown positioned in a container 44, where it is submerged in a solution 46 for storage, handling and/or transport. In this combination, the vents 42 of the distal cap 28 ensure continued protective and nutritional contact for the donor tissue 16 with the solution 46, while it is in the container 44.

While the particular Protector Assembly for Handling and Transporting Corneal Tissue as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A protector assembly for handling, storing and transporting donor tissue comprising:

a tissue transfer pipette formed with a fluid chamber for holding a solution and a donor tissue therein between a proximal end and a distal end thereof, wherein the fluid chamber is tapered in a distal direction to an open distal end and the fluid chamber has an outer diameter $D_c$ at a predetermined distance d on the taper from the distal end of the pipette;

an extension tube having an open first end and a second end connected for fluid communication between the extension tube and the fluid chamber of the pipette, wherein the extension tube is formed with an external rib extending radially outwardly therefrom to an outer diameter $D_r$;

a tubular shaped, elongated distal cap having a hollow interior between an open end and a closed end, and formed with a plurality of vents for fluid communication into the interior of the distal cap, wherein the interior of the distal cap defines an inner diameter $D_c$ dimensioned for a friction engagement with the outer diameter $D_c$ of the fluid chamber to establish fluid communication between the vents of the distal cap and the tapered distal end of the pipette; and a cylindrical shaped, elongated proximal plug having a hollow interior between an open end and a closed end, wherein the interior of the proximal plug defines an inner diameter $D_i$ dimensioned for a friction engagement between the plug and a diameter $D_r$ of the rib on the extension tube to prevent leakage of solution from the fluid chamber of the pipette when the proximal plug is engaged with the pipette.

2. The protector assembly of claim 1 further comprising a container filled with a solution for receiving the protector assembly engaged with the transfer pipette holding a donor tissue therein for protection and preservation of the donor tissue during handling and transport.

3. The protector assembly of claim 2 wherein the solution is selected from the group consisting of Optisol GS and Life4C.

4. The protector assembly of claim 1 wherein the open end of the proximal plug is beveled, and the open end of the distal cap is beveled to facilitate a respective engagement with, and a disengagement from, the transfer pipette.

5. The protector assembly of claim 1 wherein the transfer pipette is made of a clear glass.

6. The protector assembly of claim 1 wherein the proximal plug and the distal cap are made of silicone.

7. The protector assembly of claim 1 wherein the distal end of the transfer pipette is beveled to facilitate a collection and a discharge of a donor tissue into and out of the fluid chamber.

8. A method for manufacturing a protector assembly for engagement with a donor tissue transfer pipette, wherein the transfer pipette includes a distally tapered fluid chamber in fluid communication with a proximally extending extension tube, the method comprising the steps of:
   creating a tubular shaped, elongated distal cap having a hollow interior between an open proximal end and a closed distal end;
   forming the distal cap with a plurality of vents to establish fluid communication paths into the interior of the distal cap, and wherein the hollow interior of the distal cap defines an inner diameter $D_c$ dimensioned for a friction engagement of the distal cap with an outer diameter $D_c$ of the fluid chamber of the tissue transfer pipette to establish fluid communication between the vents of the distal cap and a tapered distal end of the pipette during the engagement therewith; and
   creating a cylindrical shaped, elongated proximal plug having a hollow interior between an open end and a closed end thereof, wherein the interior of the proximal plug defines an inner diameter $D_i$ dimensioned for a friction engagement of the proximal plug with a diameter $D_r$ of a rib on the extension tube of the tissue transfer pipette, to prevent leakage of solution from the fluid chamber of the pipette through the extension tube when the proximal plug is engaged therewith.

9. The method of claim 8 further comprising the step of providing a container filled with a solution for receiving the protector assembly engaged with the transfer pipette holding a donor tissue therein for protection and preservation of the donor tissue during handling and transport.

10. The method of claim 9 wherein the solution is selected from the group consisting of Optisol GS and Life4C.

11. The method of claim 8 further comprising the steps of:
   beveling the open end of the proximal plug; and
   beveling the open end of the distal cap to facilitate an engagement and a subsequent disengagement of the proximal plug and the distal cap, from the transfer pipette.

12. The method of claim 8 wherein the transfer pipette is made of a clear glass.

13. The method of claim 8 wherein the proximal plug and the distal cap are made of silicone.

14. The method of claim 8 wherein the distal end of the transfer pipette is beveled to facilitate a collection and a discharge of a donor tissue into and out of the fluid chamber.

15. A protector assembly for engagement with a donor tissue transfer pipette, wherein the transfer pipette includes a distally tapered fluid chamber holding the donor tissue therein, with the fluid chamber in fluid communication with an extension tube extending proximally from the fluid chamber, the protector assembly comprising:
   a tubular shaped, elongated distal cap having a hollow interior between an open proximal end and a closed distal end, wherein the distal cap is formed with a plurality of vents to establish fluid communication paths into the interior of the distal cap, and wherein the hollow interior of the distal cap defines an inner diameter $D_c$ dimensioned for a friction engagement of the distal cap with an outer diameter $D_c$ of the fluid chamber of the tissue transfer pipette to establish fluid communication between the vents of the distal cap and a tapered distal end of the pipette during the engagement therewith; and
   a cylindrical shaped, elongated proximal plug having a hollow interior between an open end and a closed end thereof, wherein the interior of the proximal plug defines an inner diameter $D_i$ dimensioned for a friction engagement of the proximal plug with a diameter $D_r$ of a rib on the extension tube of the tissue transfer pipette, to prevent leakage of solution from the fluid chamber of the pipette through the extension tube when the proximal plug is engaged therewith.

16. The protector assembly of claim 15 further comprising a container filled with a solution for receiving the transfer pipette holding a donor tissue therein engaged with the distal cap and the proximal plug for protection and preservation of the donor tissue during handling and transport.

17. The protector assembly of claim 16 wherein the solution is selected from the group consisting of Optisol GS and Life4C.

18. The protector assembly of claim 15 wherein the open end of the proximal plug is beveled and the open end of the distal cap is beveled to facilitate an engagement of the proximal plug and the distal cap with the transfer pipette and a subsequent disengagement therefrom.

19. The protector assembly of claim 15 wherein the transfer pipette is made of a clear glass.

20. The protector assembly of claim 15 wherein the proximal plug and the distal cap are made of silicone.

* * * * *